United States Patent [19]

Emmett

[11] 4,289,061
[45] Sep. 15, 1981

[54] DEVICE AND ASSEMBLY FOR MOUNTING PARTS

[75] Inventor: John E. Emmett, Farmington Hills, Mich.

[73] Assignee: Hooker Chemicals & Plastics Corp., Niagara Falls, N.Y.

[21] Appl. No.: 80,614

[22] Filed: Oct. 1, 1979

Related U.S. Application Data

[63] Continuation-in-part of Ser. No. 898,555, Apr. 21, 1978, which is a continuation-in-part of Ser. No. 839,046, Nov. 3, 1977, abandoned.

[51] Int. Cl.³ .............................................. F16B 13/06
[52] U.S. Cl. ........................................ 411/34; 411/38; 411/371; 411/544; 411/908; 411/909
[58] Field of Search ................... 85/69, 71, 77, 74, 73, 85/63, 78, 50, 1 JP, 76, 70, 82, 83

[56] References Cited

U.S. PATENT DOCUMENTS

| | | | |
|---|---|---|---|
| 1,419,979 | 6/1922 | Ogden | 85/70 |
| 2,257,538 | 9/1941 | Schlueter | 85/70 |
| 2,324,142 | 7/1943 | Eklund | 85/70 X |
| 3,321,200 | 5/1967 | Polhemus et al. | |
| 3,404,596 | 10/1968 | Ryder | 85/70 |

FOREIGN PATENT DOCUMENTS

| | | |
|---|---|---|
| 389752 | 3/1933 | United Kingdom . |
| 450812 | 7/1936 | United Kingdom . |
| 1174923 | 12/1969 | United Kingdom . |
| 1279957 | 6/1972 | United Kingdom . |
| 1301159 | 12/1972 | United Kingdom . |
| 2002866 | 2/1979 | United Kingdom . |

Primary Examiner—J. Franklin Foss
Attorney, Agent, or Firm—James F. Mudd

[57] ABSTRACT

An improved assembly for mounting a part onto a base member is provided by incorporating a tubular insert having a hollow inner core in a mounting hole in the part. A fastener, such as a bolt, machine screw or rivet may then be inserted through the insert in the mounting hole for attachment to the base member. When the assembly is subjected to axial compression by the fastener, the insert collapses uniformly in an axial direction to absorb a substantial amount of the total compressive load exerted upon tightening the fastener.

24 Claims, 4 Drawing Figures

DEVICE AND ASSEMBLY FOR MOUNTING PARTS

REFERENCE TO RELATED APPLICATION

This is a continuation-in-part of copending application Ser. No. 898,555, filed Apr. 21, 1978, as a continuation-in-part of application Ser. No. 839,046, filed Nov. 3, 1977, now abandoned.

BACKGROUND OF THE INVENTION

This invention relates to a substantially tubular insert which is capable of collapsing in an axial direction in response to a compressive force exerted by a fastening element, and to an assembly incorporating said insert as an integral component thereof. Upon compression of the insert, a considerable portion of the net compressive load exerted by the fastener is absorbed by the insert without excessive loading on the article.

As is well-known in the fastener art, the problem of maintaining adequate compression or torque when assembling metal or non-metal parts to other assemblies having dissimilar coefficients of thermal expansion has persisted in industry for many years and has previously denied the acceptance of materials in fields of application in which they would otherwise find great utility. A part which is subjected to a compressive load due to the clamping action of a fastener will tend to deform over a period of time, as a result of a condition known as "cold flow", i.e. permanent deformation resulting from prolonged application of a stress below the elastic limit of a material. This condition is further aggravated when an assembly is thermally cycled and the part tends to undergo a greater expansion than the metal fastener will permit due to the dissimilarities in thermal expansion coefficients. This is especially true, for instance, in the automotive industry where assemblies are frequently exposed to severe temperature cycles during which the materials are alternately subjected to thermal expansion and contraction.

In the past, various types of inserts have been employed in plastic articles either by press-fitting the insert into a finished molding or by placing the insert in the cavity so that it becomes an integral part of the molding. Typical inserts of this type include a wide variety of internally threaded bushings used for attaching a molded plastic article to another object. By way of example, U.S. Pat. No. 2,591,575 to McCollum, describes an internally-threaded, expandable fastener insert for use in molded plastic articles adapted to be anchored to the plastic article by means of which other parts may be fastened thereto.

This and other similar prior art inserts are distinguished from the insert of the present invention which is not internally threaded to engage a fastener and is not adapted to anchor the part by expanding outwardly in a radial direction in response to compressive loading by a fastener. Rather, the insert of this invention is designed to collapse uniformly in an axial direction without exerting lateral forces on the part due to lateral motion of the external surface. In this manner, the insert described herein will prevent substantial deformation of the part while maintaining the specified compressive loading on the assembly.

Accordingly, it is a principal object of the instant invention to provide a means for mounting parts onto a workpiece by employing a collapsible tubular insert in the part which is adapted to absorb a substantial amount of the total compressive load exerted upon tightening a fastener.

SUMMARY OF THE INVENTION

The assembly of this invention comprises a part which may be formed from plastic, wood, or a metal having a higher coefficient of expansion than steel, and a hollow cylindrical insert. The part is provided with a mounting hole which is sized to accomodate the insert. The insert is sized so that it is securely engaged in the mounting hole, the engagement being provided by fitting the insert in the mounting hole after molding or machining the part. It is also essential that the length of the insert exceed the thickness of the part so that the upper end surface of the insert can extend beyond the upper surface of the part to provide the initial engagement with the fastener.

In order to permit the insert to collapse uniformly in an axial direction, relative to the axis of symmetry of the insert, the insert may be provided with an annular groove formed along its external surface. There may be a single groove or a plurality of grooves or, in an alternate embodiment, the cylinder walls may be formed into evenly-spaced corrugations. They may have a rounded, triangular, rectangular or squared cross-section, although a rounded cross-section is preferred. Optionally, the groove may be designed with a centrally disposed annular bulge or ridge, as shown in FIG. 1 and FIG. 2.

While the groove may have a variety of configurations, the depth of the groove is significant since the thickness of the cylinder wall at the grooved section determines the compressive load necessary to cause the insert to collapse. This collapsed load is somewhat less than the total rated compressive load for the assembly. Thus, the insert is caused to collapse until its upper end surface is in substantial alignment with the upper surface of the part. In this configuration, the washer, if one is employed, makes physical contact with both the insert and the part. As the fastener is tightened further until the total rated compressive load for the assembly is reached, the insert absorbs a substantial amount of total load applied by the fastener.

In addition, the insert is adapted to collapse uniformly in an axial direction without outward lateral motion of the cylinder walls into the part. Thus, the insert does not exert forces on the part which could result in excessive stress and deformation.

DESCRIPTION OF THE PREFERRED EMBODIMENTS

Figure 1:
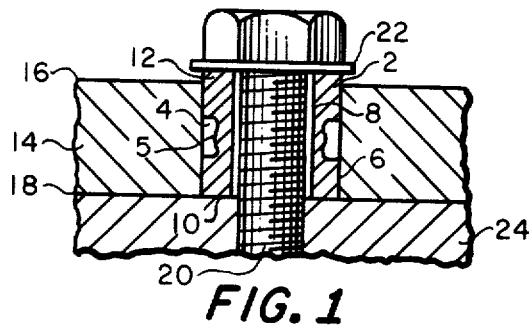
FIG. 1 is a sectional view of the assembly prior to the application of compressive loading.

FIG. 1 shows the hollow cylindrical insert 2 engaged in a mounting hole in part 14. The insert 2 is provided with an annular groove 4 formed along external wall surface 6, and an internal wall surface 8 of uniform diameter. In this particular embodiment, the groove design incorporates an annular ridge 5 formed within the groove. The insert 2 is also provided with a lower end surface 10, which is substantially aligned with the lower surface 18 of part 14, and an upper end surface 12 extending beyond the upper surface 16 of said part. Fastener element 20, with washer 22, is shown aligned through the insert 2, engaging the upper end surface 12 of the insert and base member 24. While fastener 20 is depicted as a bolt, it may be another threaded fastener such as a screw, but may also be a rivet.

Figure 2:
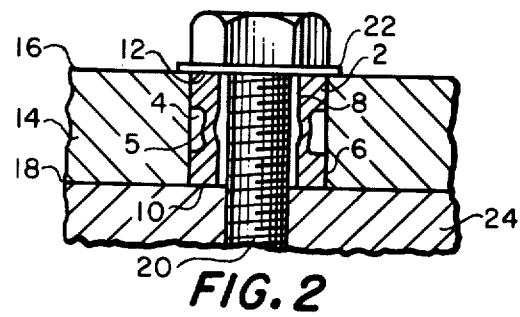
FIG. 2 is a sectional view of the assembly of FIG. 1 after applying compressive force.

FIG. 2 shows the fastener assembly embodied in FIG. 1 with the insert 2 depicted in a collapsed condition, wherein the upper end surface 12 thereof is in substantial alignment with the upper surface 16 of part 14, and the washer 22 is in contact with both the upper end surface 12 of the insert and the upper surface 16 of the part.

Annular ridge 5 is shown with an outward fold or crease relative to the axis of symmetry of the insert. It should, however, be noted that while FIG. 2 is intended to illustrate a typical compressed or collapsed configuration, this invention is not limited to any particular collapsed configuration. Thus, the ridge 5 may, in a particular instance, be caused to fold inward if desired.

Figure 3:
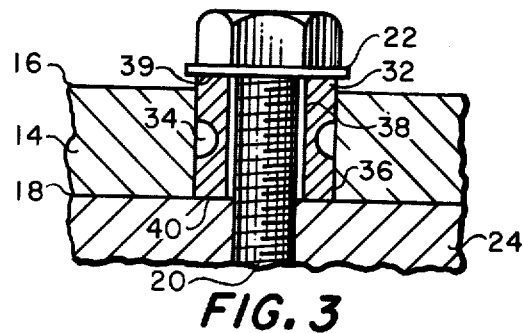
FIG. 3 is a sectional view analogous to FIG. 1 but illustrating an alternate groove design for the insert.

FIG. 3 illustrates another embodiment of the assembly of FIG. 1 with insert 32 having lower end surface 40, upper end surface 39, internal wall surface 38 of substantially uniform diameter, and a substantially rounded annular groove 34 formed along the external wall surface 36.

Figure 4:
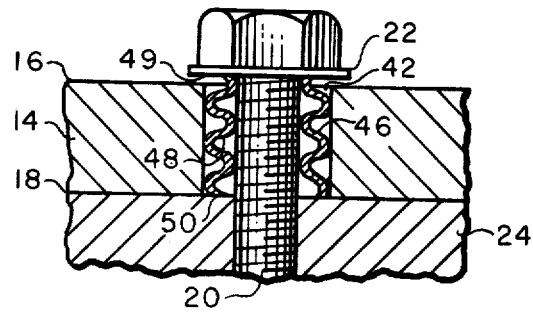
FIG. 4 is a sectional view analogous to FIG. 1 but illustrating an alternate insert configuration.

FIG. 4 shows a further embodiment of the assembly of FIG. 1 wherein insert 42, having a lower end surface 50, an upper end surface 49, internal wall surface 48, and external wall surface 46, said insert being provided with a multiplicity of evenly-spaced annular corrugations on both the internal and external wall surfaces.

The insert may be fabricated of any suitable materials which satisfy the performance criteria. Suitable materials include, but are not limited to, metallic materials, including steel, brass, and aluminum, and the like, as well as plastic materials, such as nylon. The term "plastic", as employed in the instant specification and claims, is intended to denote a molded synthetic polymer, including both the thermoplastic and thermosetting varieties, which may be cured to a hardened state. A typical example of such a molded plastic material is a phenolic resin.

It is also contemplated that the base member may be formed of any solid, i.e. physically rigid, material such as, for example, plastic, metal, concrete, wood, glass, and the like.

The types of fasteners which may be employed in this invention are conventional and include bolts, machine screws, wood screws, rivets, and the like, with the only limitation being that the particular fastener be compatible with the base member and be capable of collapsing the insert. The fastener is preferably fabricated from metal, especially steel, and may or may not include a washer.

The article or part to be attached to the base member may be formed from any physically rigid material having a higher coefficient of thermal expansion than the fastener material, and would therefore include materials such as plastic, wood, metals such as aluminum, and the like. In a preferred embodiment, the part is fabricated from a plastic material derived from a phenolic resin and various filler materials.

Although the insert has been described in terms of the various groove configurations embodied in the drawings, it is not intended thereby to limit the types of inserts which may be employed herein. Of those particular embodiments shown, however, the configuration provided in FIGS. 1 and 2 is most preferred since it is less likely to crack or fracture at the grooved section.

The novel assembly of this invention is useful in a number of applications, particularly in those environments where the assembly is subjected to repeated fluctuations in temperature. As a specific example, an article such as a plastic component for an internal combustion engine, such as a plastic water pump, could be mounted directly to the engine block by employing the insert device as provided herein.

While this invention has been illustrated and described in terms of particular embodiments thereof, it is not intended to be limited to the details shown, since various modifications and changes may be made without departing in any way from the spirit of the present invention.

I claim:

1. A tubular insert adapted for use in mounting a part onto a base member, said insert having a hollow inner core for receiving a fastener and further having at least one annular groove formed around the external cylindrical surface thereof to permit said insert to collapse uniformly in an axial direction responsive to a compressive force exerted in an axial direction against the end of said insert and said insert having a sufficient wall thickness at said groove that the wall yields at said groove when the fastener develops the desired compressive force, whereby a substantial portion of said compressive force is absorbed by said insert and whereby the insert functions without being dependent on exerting lateral forces on an external surface due to lateral motion of the external surface of said insert.

2. The insert of claim 1 wherein said groove has an annular ridge in the central portion thereof.

3. The insert of claim 1 formed from a metal.

4. A tubular insert adapted for use in mounting a part onto a base member, said insert having a hollow inner core for receiving a fastener and further having a substantially uniform thickness and a plurality of evenly-spaced annular corrugations to permit said insert to collapse uniformly in an axial direction responsive to a compressive force exerted in an axial direction against the end of said insert and said insert having a sufficient wall thickness at said groove that the wall yields at said groove when the fastener develops the desired compressive force, whereby a substantial portion of said compressive force is absorbed by said insert and whereby the insert functions without being dependent on exerting lateral forces on an external surface due to lateral motion of the external surface of said insert.

5. The insert of claim 3 formed from a metal.

6. An assembly for mounting parts onto a base member, said assembly comprising (1) a part having a lower surface for attachment to a base member and a mounting hole for receiving a fastener, and (2) a tubular insert engaged in said mounting hole, the lower end surface of said insert being in substantial alignment with the lower surface of the part, and the upper end surface of said insert projecting outward from the upper surface of the part, said insert having a hollow inner core for receiving a fastener and further having at least one annular groove formed along the external surface thereof to permit said insert to collapse uniformly in an axial direction responsive to a compressive force exerted by the fastener and said insert having a sufficient wall thickness that the wall yields when the fastener develops the desired compressive force, whereby a substantial portion of said compressive force is absorbed by said insert when the upper surface thereof is substantially aligned with the surface of the part in the collapsed configuration and whereby the insert functions without being dependent on exerting lateral forces on the part due to lateral motion of the external surface of said insert.

7. The assembly of claim 6 wherein the groove in said insert has an annular ridge in the central portion thereof.

8. The assembly of claim 6 wherein the part is fabricated from a plastic material.

9. The assembly of claim 6 wherein the part is fabricated from a metallic material having a higher coefficient of thermal expansion than the fastener material.

10. An assembly for mounting parts onto a base member, said assembly comprising (1) a part having a lower surface for attachment to a base member and a mounting hole for receiving a fastener, said part comprising a rigid solid having a higher coefficient of expansion than the fastener material, and (2) a metallic tubular insert engaged in said mounting hole, said insert having a substantially uniform wall thickness and a plurality of evenly-spaced annular corrugations, the lower end surface of said insert being in substantial alignment with the lower surface of the part, and the upper end surface of said insert projecting outward from the upper surface of the part, said insert having a hollow inner core for receiving a fastener and further being adapted to collapse uniformly in an axial direction responsive to a compressive force exerted by the fastener and said insert having a sufficient wall thickness that the wall yields when the fastener develops the desired compressive force, whereby a substantial portion of said compressive force is absorbed by said insert when the upper surface thereof is substantially aligned with the surface of the part in the collapsed configuration and whereby the insert functions without being dependent on exerting lateral forces on the part due to lateral motion of the external surface of said insert.

11. The assembly of claim 10 wherein said rigid solid is plastic material.

12. In a fastener assembly comprising a plastic member attached to a base member by means of a fastener inserted through a mounting hole in said plastic member, the improvement which comprises having a hollow cylindrical insert engaged in said mounting hole, the lower end surface of said insert being in substantial alignment with the surface of said plastic member adjacent to said base member, and the upper end surface of said insert projecting outward from the surface of said plastic member removed from said base member, said insert having at least one annular groove formed along the external wall surface thereof to permit said insert to collapse uniformly in an axial direction responsive to a compressive force exerted by the fastener and said insert having a sufficient wall thickness at said groove that the wall yields at said groove when the fastener develops the desired compressive force, whereby a substantial portion of said compressive force is absorbed by said insert when the upper end surface thereof is substantially aligned with the surface of said plastic member in a collapsed configuration and whereby the insert functions without being dependent on exerting lateral forces on the plastic member due to lateral motion of the external surface of said insert.

13. A tubular insert adapted for use in mounting a part onto a base member, said insert having a hollow inner core for receiving a threaded fastener and further having at least one annular groove formed around the external cylindrical surface thereof to permit said insert to collapse uniformly in an axial direction responsive to a compressive force exerted in an axial direction against the end of said insert and said insert having a sufficient wall thickness at said groove that the wall yields at said groove when the threaded fastener achieves its torque, whereby a substantial portion of said compressive force is absorbed by said insert and whereby the insert functions without being dependent on exerting lateral forces on an external surface due to lateral motion of the external surface of said insert.

14. The insert of claim 13 wherein said groove has an annular ridge in the central portion thereof.

15. The insert of claim 13 formed from a metal.

16. A tubular insert adapted for use in mounting a part onto a base member, said insert having a hollow inner core for receiving a threaded fastener and further having a substantially uniform thickness and a plurality of evenly-spaced annular corrugations to permit said insert to collapse uniformly in an axial direction responsive to a compressive force exerted in an axial direction against the end of said insert and said insert having a sufficient wall thickness at said corrugations so that the wall yields at said corrugations when the threaded fastener achieves its torque, whereby a substantial portion of said compressive force is absorbed by said insert and whereby the insert functions without being dependent on exerting lateral forces on an external surface due to lateral motion of the external surface of said insert.

17. The insert of claim 16 formed from a metal.

18. An assembly for mounting parts onto a base member, said assembly comprising (1) a part having a lower surface for attachment to a base member and a mounting hole for receiving a threaded fastener, and (2) a tubular insert engaged in said mounting hole, the lower end surface of said insert being in substantial alignment with the lower surface of the part, and the upper end surface of said insert projecting outward from the upper surface of the part, said insert having a hollow inner core for receiving a threaded fastener and further having at least one annular groove formed along the external surface thereof to permit said insert to collapse uniformly in an axial direction responsive to a compressive force exerted by the fastener and said insert having a sufficient wall thickness that the wall yields when the threaded fastener achieves its torque, whereby a substantial portion of said compressive force is absorbed by said insert when the upper surface thereof is substantially aligned with the surface of the part in the collapsed configuration and whereby the insert functions without being dependent on exerting lateral forces on the part due to lateral motion of the external surface of said insert.

19. The assembly of claim 18 wherein the groove in said insert has an annular ridge in the central portion thereof.

20. The assembly of claim 18 wherein the part is fabricated from a plastic material.

21. The assembly of claim 18 wherein the part is fabricated from a metallic material having a higher coefficient of thermal expansion than the fastener material.

22. An assembly for mounting parts onto a base member, said assembly comprising (1) a part having a lower surface for attachment to a base member and a mounting hole for receiving a threaded fastener, said part comprising a rigid solid having a higher coefficient of expansion than the fastener material, and (2) a metallic tubular insert engaged in said mounting hole, said insert having a substantially uniform wall thickness and a plurality of evenly-spaced annular corrugations, the lower end surface of said insert being in substantial alignment with the lower surface of the part, and the upper end surface of said insert projecting outward from the upper surface of the part, said insert having a hollow inner core for receiving a threaded fastener and further being adapted to collapse uniformly in an axial direction responsive to a compressive force exerted by the fastener and said insert having a sufficient wall thickness that the wall yields when the threaded fastener achieves its torque, whereby a substantial portion of said compressive force is absorbed by said insert when the upper surface thereof is substantially aligned with the surface of the part in the collapsed configuration and whereby the insert functions without being dependent on exerting lateral forces on the part due to lateral motion of the external surface of said insert.

23. The assembly of claim 22 wherein said rigid solid is plastic material.

24. In a fastener assembly comprising a plastic member attached to a base member by means of a threaded fastener inserted through a mounting hole in said plastic member, the improvement which comprises having a hollow cylindrical insert engaged in said mounting hole, the lower end surface of said insert being in substantial alignment with the surface of said plastic member adjacent to said base member, and the upper end surface of said insert projecting outward from the surface of said plastic member removed from said base member, said insert having at least one annular groove formed along the external wall surface thereof to permit said insert to collapse uniformly in an axial direction responsive to a compressive force exerted by the fastener and said insert having a sufficient wall thickness at said groove that the wall yields at said groove when the threaded fastener achieves its torque, whereby a substantial portion of said compressive force is absorbed by said insert when the upper end surface thereof is substantially aligned with the surface of said plastic member in a collapsed configuration and whereby the insert functions without being dependent on exerting lateral forces on the plastic member due to lateral motion of the external surface of said insert.

* * * * *